United States Patent [19]

Schuitema

[11] Patent Number: 4,807,855
[45] Date of Patent: Feb. 28, 1989

[54] GAS CYLINDER PLUNGER LOCK

[75] Inventor: Frank M. Schuitema, Grand Rapids, Mich.

[73] Assignee: Suspa, Incorporated, Grand Rapids, Mich.

[21] Appl. No.: 77,380

[22] Filed: Jul. 24, 1987

[51] Int. Cl.[4] .............................. F16F 5/00; F16F 9/32; G05G 5/06; F15B 15/26
[52] U.S. Cl. .................................. 267/64.12; 74/527; 92/27; 188/300; 267/120
[58] Field of Search .................. 188/265, 300, 67; 267/64.12, 64.11, 120, 113, 64.26; 16/66, 84; 296/56; 292/338, DIG. 43, 179; 74/527; 92/27, 15, 23, 28, 30

[56] References Cited

U.S. PATENT DOCUMENTS

| 2,834,435 | 5/1958 | Van Der Beck | 188/67 X |
|---|---|---|---|
| 3,789,724 | 2/1974 | Hershman et al. | 188/67 X |
| 3,851,867 | 12/1974 | Fricko | 267/120 |
| 4,043,253 | 8/1977 | Albright et al. | 92/27 X |
| 4,078,779 | 3/1978 | Molders | 188/300 X |
| 4,596,383 | 6/1986 | Howard | 188/300 X |

FOREIGN PATENT DOCUMENTS

| 3442262 | 8/1985 | Fed. Rep. of Germany . | |
|---|---|---|---|
| 0014636 | 7/1979 | Japan | 267/64.12 |
| 0186647 | 11/1982 | Japan . | |

OTHER PUBLICATIONS

Figures A & B of Gas Springs Marketed By Suspa Inc.

Primary Examiner—Andres Kashnikow
Assistant Examiner—Robert J. Oberleitner
Attorney, Agent, or Firm—Price, Heneveld, Cooper, DeWitt & Litton

[57] ABSTRACT

A pneumatic spring having a cylinder piston and piston rod biased toward extended condition by compressed gas in the cylinder, an elongated cover tube severed at one of its ends to the outer end of the rod, extending over the length of the rod to define an annular space therebetween, and always in axial alignment with and extending over portions of the cylinder. A transversely shiftable plunger lock assembly on the cover tube near its open end includes a fixed body and a lock plunger movable transversely of the piston axis into the annular space when the rod and cylinder are extended, to abut the annular end of the cylinder to securely retain the assembly in one position, preferably a substantially extended condition.

8 Claims, 1 Drawing Sheet

GAS CYLINDER PLUNGER LOCK

BACKGROUND OF THE INVENTION

This invention relates to pneumatic spring assemblies, sometimes called gas cylinders or gas springs. Such gas cylinders are commonly employed to assist in movement of doors or lids on vehicles or machines and the like e.g., for trunk lids or hatchback lids on automobiles, and for retaining such in one position, usually the open position.

In several of the usages of such gas cylinders, the weight of the lid or door might overcome the bias of the gas cylinder and allow the lid or door to drop prematurely. Consequently, manufacturers of such cylinders have heretofore developed various types of latches to retain the gas cylinders in an extended or partly extended condition. Japanese patent application No. 14,636 and German patent document No. 3,442,262 disclose a cocking sleeve arrangement wherein the sleeve can be cocked or tilted from one position aligned with the cylinder to a second position axially at an angle to the cylinder so that an offset end ledge or surface of the sleeve will engage the end of the cylinder to prevent its retraction. Unfortunately, such an arrangement can be accidentally released as by being bumped, allowing the lid to fall. Two other arrangements which have been marketed by the assignee herein involve (A) the use of a laterally extending V-shaped spring arm or lever mounted on the piston rod and having an end biased to be cocked laterally to engage the end of the fluid cylinder, and (B) a leaf spring-biased plate which is slid between the end of a fully extended cylinder and the end of an elongated sleeve spaced from the cylinder. U.S. Pat. No. 4,078,779 employs a leaf spring along side the cylinder to enable a pin to retain the cylinder in a partially extended position against further extension of the cylinder. U.S. Pat. No. 3,789,742 employs a spring arm to retain the cylinder in a retracted position. U.S. Pat. No. 3,851,867 has a pivotal element with an arcuate cam slot interfitted with a follower pin to control the position of the pneumatic actuator. Japanese application No. 57-186,647 provides a rotatable interfit between a cylinder and a cover.

SUMMARY OF THE INVENTION

The present invention pertains to the combination fluid spring having the usual cylinder and outwardly biased extended piston rod, and having a cover tube with one end secured to the outer end of the piston rod and the other end open and always extending over portions of the cylinder of the pneumatic spring. The cover tube is always axially aligned with the cylinder. It has a diameter larger than that of the cylinder and extends over the full length of the extended portion of the cylinder rod outside of the cylinder housing, even when the rod is fully extended. The tube mounts a transversely shiftable plunger lock assembly formed of a body and a lock plunger movable therein on an axis transverse to the cylinder axis when the piston rod is extended and, biased inwardly into the cover tube to abut the annular end of the cylinder for retaining the assembly in a substantially extended position.

DETAILED DESCRIPTION OF THE PREFERRED EMBODIMENT

Figure 1:
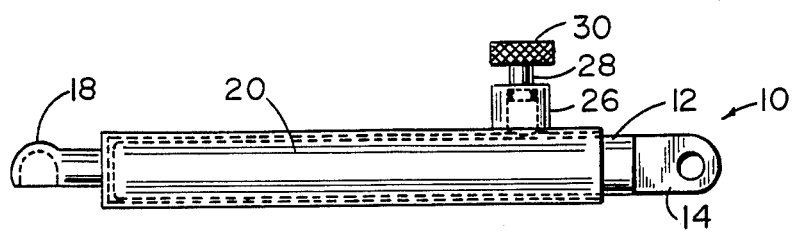
FIG. 1 is a side elevational view of the combination with the cylinder in its fully retracted position.
Figure 2:
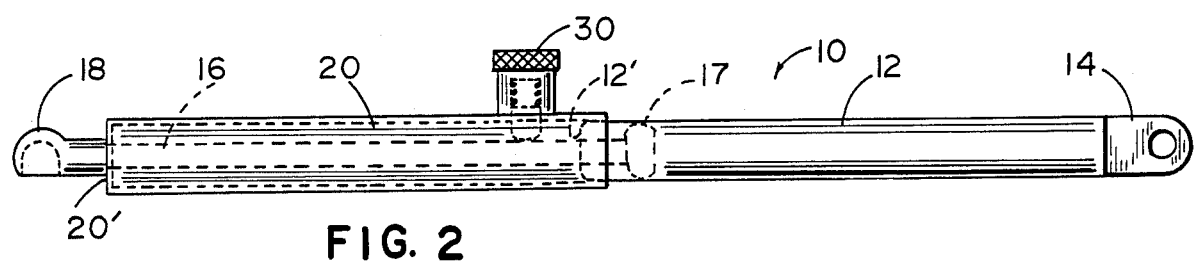
FIG. 2 is a side elevational view of the combination with the cylinder in its fully extended position.
Figure 3:
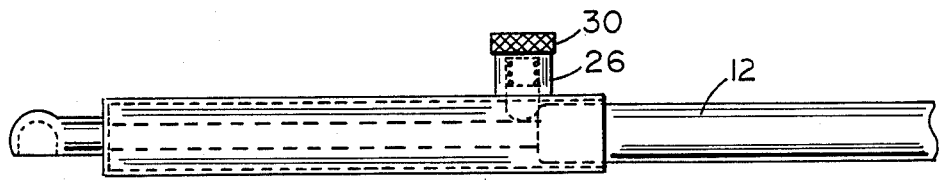
FIG. 3 is a fragmentary side elevational view of the combination with the cylinder locked in substantially extended position.

Referring now specifically to the drawings, the combination 10 includes an elongated hollow cylinder 12 of conventional type defining an elongated cavity therein and having a conventional connector 14 on one end thereof for attachment to a vehicle, a machine, or the like. Within cylinder 12 is a conventional seal and piston subassembly 17. Connected to this piston 17 and extending out the end of cylinder 12 opposite connector 14 is an elongated piston rod 16 movable between one extreme retracted position wherein said piston rod is substantially within cylinder 12 (FIG. 1) and the extreme extended position wherein said piston rod is substantially outside of cylinder 12 (FIG. 2). The elongated piston rod has a much smaller diameter than the cylinder diameter and is axially aligned therewith. The rod has an inner end in the cylinder and an outer end outside of the cylinder. The end 12' of cylinder 12 through which rod 16 extends is annular, having a seal (not shown) around the rod in conventional fashion. The cylinder chamber between the piston 17 and connector end 14 contains a fluid, typically a compressed gas to bias the rod outwardly of the cavity i.e., to bias the cylinder and rod to the most extended condition depicted in FIG. 2. The outer end of rod 16 has a connector shown as a ball socket 18. The particular connector employed at the outer end of the rod and the opposite end of the cylinder can be varied to suit the particular installation e.g., being ball sockets, being orificed flange connectors or otherwise as desired.

Figure 4:
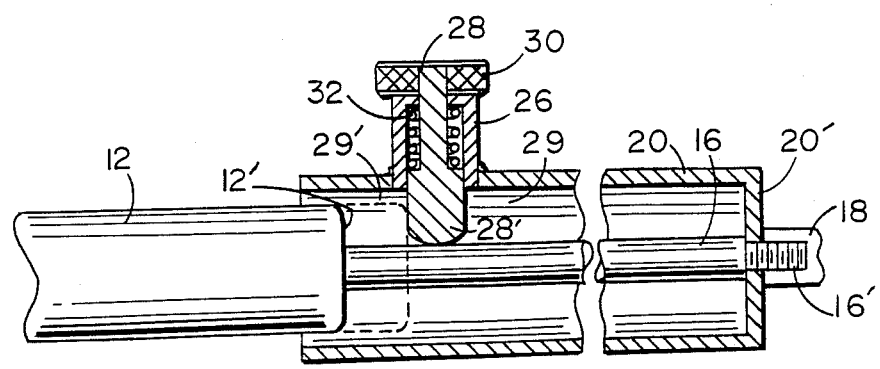
FIG. 4 is an enlarged fragmentary sectional elevational view of the combination with the space between the cylinder and cover tube being exaggerated for purposes of clarity.

Encompassing extended rod 16 and a portion of cylinder 12 is cylindrically shaped cover tube 20. The outer end 20' of tube 20 has an end wall attached to the outer end of the rod. This may be achieved, for example, by socket connector 18 being threaded on the extended threaded stud 16' of rod 16 (FIG. 4) after the orificed end 20' of cover tube 20 is placed over the threaded stud. The inner end of tube 20 is open. Cover tube 20 is of sufficient length to always encompass the entire extended portion of rod 16 and a portion of cylinder 12. This is always axially aligned with cylinder 12. When the rod is fully extended, cover tube 20 extends over only a small portion of cylinder 12 (FIG. 2). When the cylinder is fully retracted, cover tube 20 extends over most of cylinder 12 (FIG. 1).

Mounted to be integral with cover tube 20 near its open end i.e., opposite the end attached to the extended rod end, but spaced from the open end of cover tube 20, is a plunger lock assembly including a tubular body 26 secured as by welding and extending outwardly of cover 20. This tubular body has an open inner end, the opening also extending through tube 20. The outer end of body 26 has an annular end around a central opening through which a plunger 28 extends. Secured to the outer end of plunger 28 outside of body 26 is a grippable element shown as a knurled knob 30. Inside body 26 and around plunger 28 is a compression coil spring 32. One end of this coil spring abuts against the inner face of the annular outer end of body 26 while the opposite end of the spring abuts against the annular seat on plunger 28, to bias the inner end 28' of plunger 28 toward the annular cavity 29 between rod 16 and surrounding cover tube 20. Plunger 28 is therefore biased toward the path of cylinder 12. The knurled knob enables plunger 28 to be manually retracted transversely out of the path of cylinder 12 to allow cover tube 20 to move telescopically over more of the cylinder when the unit is to be shifted to a retracted condition. The plunger is shiftable reciprocally on its axis within tubular body 26 transverse and basically normal to the axis of cylinder 12, rod 16, and cover tube 20. Plunger 28 is spaced from end 20' of cover tube 20 a distance less than the fully extended length of piston rod 16 beyond annular end 12' of cylinder 12. Thus, when piston rod 16 is fully extended from cylinder 12, an axial space 29' will exist between the inner plunger end 28' and annular cylinder end 12' (FIG. 4), enabling the plunger to be automatically inserted under the bias of spring 32. Removal of the lifting force on the lid or door or the like may then enable the weight of the lid to retract the cylinder assembly slightly until annular end 12' abuts plunger inner end 28' as shown by phantom lines in FIG. 4. The plunger lock mechanism of the device as depicted will therefore securely retain the cylinder in one position which is a substantially fully extended position.

Withdrawal of the plunger lock must be purposely performed by retracting the plunger using knurled knob 30. Accidental release is thus prevented. The frictional and side loading engagement between cylinder end 12' and plunger end 28' is usually sufficient to prevent this retraction until the cylinder and rod assembly are again fully extended to create the space 29' between the plunger and cylinder.

The novel combination is simple, reliable and easy to use. The cover fully protects the rod from damage or dirt which could interfere with the seal between the rod and cylinder end. The plunger assembly can be employed to accommodate the smallest to the largest diameter gas cylinders available. The plunger forms a positive stop for high degree of safety. It cannot be accidentally dislodged to allow a hatchback lid or the like to drop on someone. Opening of the lid or the like with extension of the gas cylinder causes the device to automatically snap into locked position. Release of the mechanism must be purposely done, preventing premature release.

Various minor changes could conceivably be made in the device depicted in its preferred form. The invention is intended to be limited only by the scope of the appended claims and the reasonably equivalent structures thereto, rather than to the preferred illustrative embodiment depicted.

The embodiments of the invention in which an exclusive property or privilege is claimed are defined as follows:

1. A fluid spring assembly comprising:
   a cylinder defining a cavity therein;
   a rod movable axially inwardly and outwardly of said cavity between retracted and extended positions, said rod having an inner end in said cylinder and an outer end outside of said cylinder;
   a piston in said cavity on the inner end of said rod, slidingly engageable with said cylinder in sealed relationship thereto;
   fluid in said cavity for shifting said rod outwardly of said cavity;
   said cylinder having an annular end around the extending rod;
   plunger lock means for holding said rod in one position, comprising a cover tube having one end secured to said rod outer end and having the other end open and around said cylinder, said cover tube having a diameter larger than that of said cylinder, and extending over the length of the rod outside said cylinder, defining an annular space around said rod; said cover tube always being axially aligned with said cylinder and said rod and always extending over portions of said cylinder; a lock plunger body on said cover tube, extending transversely therefrom; a lock plunger supported by said body, movable on an axis transverse to the axis of said rod and cylinder, between a radially inner position extending into said annular space in said cover tube to abut said cylinder annular end, and a radially outer position out of abutment with said cylinder annular end;
   means biasing said plunger to said radially inner position to abut said cylinder annular end in an extended position of said rod for locking the piston rod and cylinder in said one position; and
   means for allowing shifting of said lock plunger to said radially outer position against the bias of said biasing means to release said assembly from said extended position.

2. The assembly in claim 1 wherein said means for allowing shifting of said lock plunger to said radially outer position is readily actuable after said lock plunger is disengaged from said cylinder annular end by further extension of said rod from said cylinder.

3. The assembly in claim 1 wherein said lock plunger is automatically shifted into said inner lock position by said biasing means upon extension of said rod.

4. The assembly in claim 1 wherein said lock plunger axis is normal to said axis of said rod and cylinder.

5. The assembly in claim 1 wherein said means for allowing shifting of said lock plunger is a grippable element.

6. The assembly in claim 1 wherein said lock plunger and said body are close to said cover tube open end to allow said lock plunger to move into abutment with said cylinder annular end only after said rod is in substantially fully extended position.

7. A pneumatic spring assembly comprising:
   a cylinder defining a cavity therein;
   a rod movable axially inwardly and outwardly of said cavity between retracted and extended positions, said rod having an inner end in said cylinder and an outer end outside of said cylinder;
   a piston in said cavity on the inner end of said rod, slidingly engageble with said cylinder in sealed relationship thereto;
   compressed gas in said cavity for biasing said rod outwardly of said cavity;
   said cylinder having an annular end around the extending rod;
   plunger lock means for holding said rod in one extended position, comprising a cover tube having one end secured to said rod outer end and having the other end open and around said cylinder, said cover tube having a diameter larger than that of said cylinder, and extending over the length of the rod outside said cylinder, defining an annular space around said rod; said cover tube always being axially aligned with said cylinder and said rod and always extending over portions of said cylinder; a lock plunger body on said cover tube extending transversely therefrom and normal to said rod; a lock plunger in said body, movable therein on an axis transverse to the axis of said rod and cylinder, between a radially inner position extending into said annular space in said cover tube to abut said cylinder annular end, and a radially outer position out of abutment with said cylinder annular end; said cover tube including an opening for allowing entry of said lock plunger into said annular space;

spring means biasing said plunger to said radially inner position to abut said cylinder annular end in said extended position of said rod for locking the piston rod and cylinder in said one extended position; and gripping means for allowing shifting of said lock plunger to said radially outer position against the bias of said biasing means to release said assembly from said one extended position.

8. The pneumatic spring assembly in claim 7 wherein said lock plunger and said body are close to said open end of said cover tube to lock said cylinder in the substantially fully extended position of said rod.

* * * * *